United States Patent
Kraft et al.

(10) Patent No.: US 6,182,787 B1
(45) Date of Patent: Feb. 6, 2001

(54) RIGID SANDWICH PANEL ACOUSTIC TREATMENT

(75) Inventors: Robert E. Kraft, Cincinnati; Asif A. Syed, Loveland, both of OH (US)

(73) Assignee: General Electric Company, Cincinnati, OH (US)

( * ) Notice: Under 35 U.S.C. 154(b), the term of this patent shall be extended for 0 days.

(21) Appl. No.: 09/228,563

(22) Filed: Jan. 12, 1999

(51) Int. Cl.⁷ .................................................... E04B 1/82
(52) U.S. Cl. ........................................ 181/292; 181/24
(58) Field of Search ............................. 181/213, 214, 181/205, 210, 286, 288, 290, 292, 293, 294

(56) References Cited

U.S. PATENT DOCUMENTS

| | | |
|---|---|---|
| 3,481,427 * | 12/1969 | Dobbs et al. ........................ 181/292 |
| 3,502,171 * | 3/1970 | Cowan ................................. 181/292 |
| 3,700,067 * | 10/1972 | Dobbs et al. ........................ 181/292 |
| 3,748,213 * | 7/1973 | Kitching et al. ..................... 181/292 |
| 3,972,383 | 8/1976 | Green . |
| 3,991,849 | 11/1976 | Green et al. . |
| 4,091,892 | 5/1978 | Hehmann et al. . |
| 4,189,027 | 2/1980 | Dean, III et al. . |
| 4,944,362 | 7/1990 | Motsinger et al. . |
| 5,702,230 | 12/1997 | Kraft et al. . |
| 5,923,003 * | 7/1999 | Arcas et al. ........................ 181/292 |

* cited by examiner

Primary Examiner—Khanh Dang
(74) Attorney, Agent, or Firm—Andrew C. Hess; Nathan D. Herkamp

(57) ABSTRACT

An acoustic treatment for the air ducts of a gas turbine engine. The acoustic treatment generally includes a facesheet having a plurality of holes therein, a backplate spaced apart from the facesheet, and a plurality of interconnected cells between the facesheet and backplate. Each of the cells is defined by walls attached to the facesheet and the backplate, and at least some of the walls are formed of a porous material so that air is able to flow through the cells in a direction parallel to the facesheet and backplate.

17 Claims, 4 Drawing Sheets

RIGID SANDWICH PANEL ACOUSTIC TREATMENT

FIELD OF THE INVENTION

The present invention relates to materials and structures for noise suppression. More particularly, this invention relates to an acoustic treatment panel for suppressing radiated noise in an aircraft engine nacelle, with the panel being configured as a sandwich panel that exhibits acoustic properties similar to that of bulk absorber material.

BACKGROUND OF THE INVENTION

Gas turbine engines operate over a broad range of speeds and thrusts, and as a result generate a broad range of noise frequencies. Acoustic treatments in the form of acoustic liners that line the fan and exhaust ducts of gas turbine engines are widely used to suppress aircraft engine noise beyond those levels that can be achieved by the particular design of the turbo machinery. In view of stringent noise abatement requirements around the world, considerable effort has been directed to designing acoustic liners that are capable of absorbing noise over a broad range of frequencies, while also being durable, relatively low-weight, readily fabricated, and having minimal impact on engine performance.

There are two primary sources of aircraft-generated noise. One source is the viscous shearing that takes place between the rapid exhaust gases and the relatively quiescent surrounding air, while the second source is the rotating blades of the fan, compressor and turbines, and the resulting air flow past the vanes and other stationary objects within the engine air flow path. Acoustic treatments for suppressing noise produced by the latter source can generally be categorized as bulk absorbers or resonator-type absorbers.

A bulk absorber 10 is represented in FIG. 1. With this type of treatment, a porous material 12, such as a fibrous or rigid foam material, fills a cavity between two sheets 14 and 16. The sheet 14 is formed of an air-permeable material that forms the walls of a nacelle flow duct of a gas turbine engine, e.g., the fan inlet and fan exhaust ducts and the turbine exhaust duct. The sheet 14 and the bulk absorber 10 absorb sound waves that impact these walls as the waves propagate through the duct. Examples of suitable materials for the sheet 14 include sheet fabricated from sintered or felted metal, or other porous materials having suitable flow resistances. The back sheet 16 is typically rigid and air-impermeable.

Acoustic treatments referred to as resonator-type absorbers include Helmholtz resonator chambers or compartments. A double-layer resonator absorber 20 of this type is represented in FIG. 2 as having a compartmented airspace core with an air-permeable facesheet 22 and an air-impermeable back sheet 24, between which there are a number of compartments or cells 26. The facesheet 22 typically has perforations 30 within which sound absorption occurs. In the double layer resonator 20 shown in FIG. 2, a porous septum 32 is present between and parallel to the facesheet 22 and back sheet 24. Conventional methods by which the resonator 20 is manufactured typically entail individually forming the resonator layers separated by the septum 32, and then bonding the layers and the septum 32 together. As a result, misalignment often occurs between the cells 28 of these layers. In a single-layer resonator (not shown), the porous septum 32 is omitted.

As a rule, the cells 26 of resonator-type absorbers have been defined by hard, air-impermeable walls 28, which are often configured so that the cells 26 have a hexagonal-shaped cross-section that yields a honeycomb cell pattern. Passages between resonator cells 26 have been proposed, as shown in U.S. Pat. Nos. 3,972,383 and 4,189,027. However, the former resonator absorber relies on air being forced through the cells 26 from an exterior source in order to tune the facesheet 22, while the latter absorber requires adjacent cells 26 to be asymmetric, which causes air pumping between cells 26 when air flows over the perforations 30 in the facesheet 22.

There are known advantages and shortcomings with each of the acoustic treatments described above. The double-layer resonator-type absorber 20 represented in FIG. 2 provides good noise attenuation over a relatively wide band of frequencies centered about a particular frequency to which the cells 26 are tuned, based in part on their depth. To achieve a broadband capability, a resonator-type absorber must have a variety of cavity sizes to cover the frequency range of concern, or must be capable of mechanically changing the sizes of the cells. Both of the approaches are mechanically complex and contribute undesirable weight to the engine.

In contrast, bulk absorbers of the type shown in FIG. 1 offer higher suppression performance than either single-layer or double-layer resonator-type treatments by their ability to absorb noise over a wider frequency range. In spite of this performance advantage, bulk absorbers are not widely used in aircraft engines due to disadvantages inherent in she material properties. Specifically, the conventional concern is that fibrous materials will disintegrate with aging and the high dynamic vibration levels within gas turbine engines, and may wick liquids that could create a fire hazard. Another drawback of bulk absorbers is their poor serviceability.

In view of the above, it can be seen that it would be desirable if an acoustic treatment were available for gas turbine engines, by which a broad band of noise suppression was possible along with structural integrity compatible with air flow conditions of the gas turbine engine environment.

BRIEF SUMMARY OF THE INVENTION

According to the present invention, there is provided an acoustic treatment for the air ducts of a gas turbine engine. The acoustic treatment generally includes a facesheet having a plurality of holes therein, a backplate spaced apart from the facesheet, and a plurality of interconnected cells between the facesheet and backplate. Each of the cells is defined by walls attached to the facesheet and the backplate, and at least some of the walls are formed of a porous material that provides flow resistance therethrough and allows acoustic propagation in a direction parallel to the facesheet and backplate.

A significant advantage of the above construction is that the acoustic treatment of this invention is able to exhibit the suppression performance advantages of bulk absorbers, yet has the structural advantages of a resonator-type absorber. Specifically, the porous walls of the cells allow acoustic waves to travel in a direction parallel to the facesheet, which provides the acoustic treatment with the noise suppression properties of a bulk absorber. On the other hand, the rigid facesheet and backplate provide a sandwich structure that is resistant to the hostile thermal, chemical and mechanical environment of a gas turbine engine. The porous material of the cell walls is also able to contribute to the structural integrity of the treatment without unduly restricting airflow between adjacent cells. With this construction, cell size and cell wall porosity can both be controlled in order to achieve the desired acoustic and structural properties for a particular acoustical environment.

Other objects and advantages of this invention will be better appreciated from the following detailed description.

DETAILED DESCRIPTION OF THE INVENTION

Figure 6:
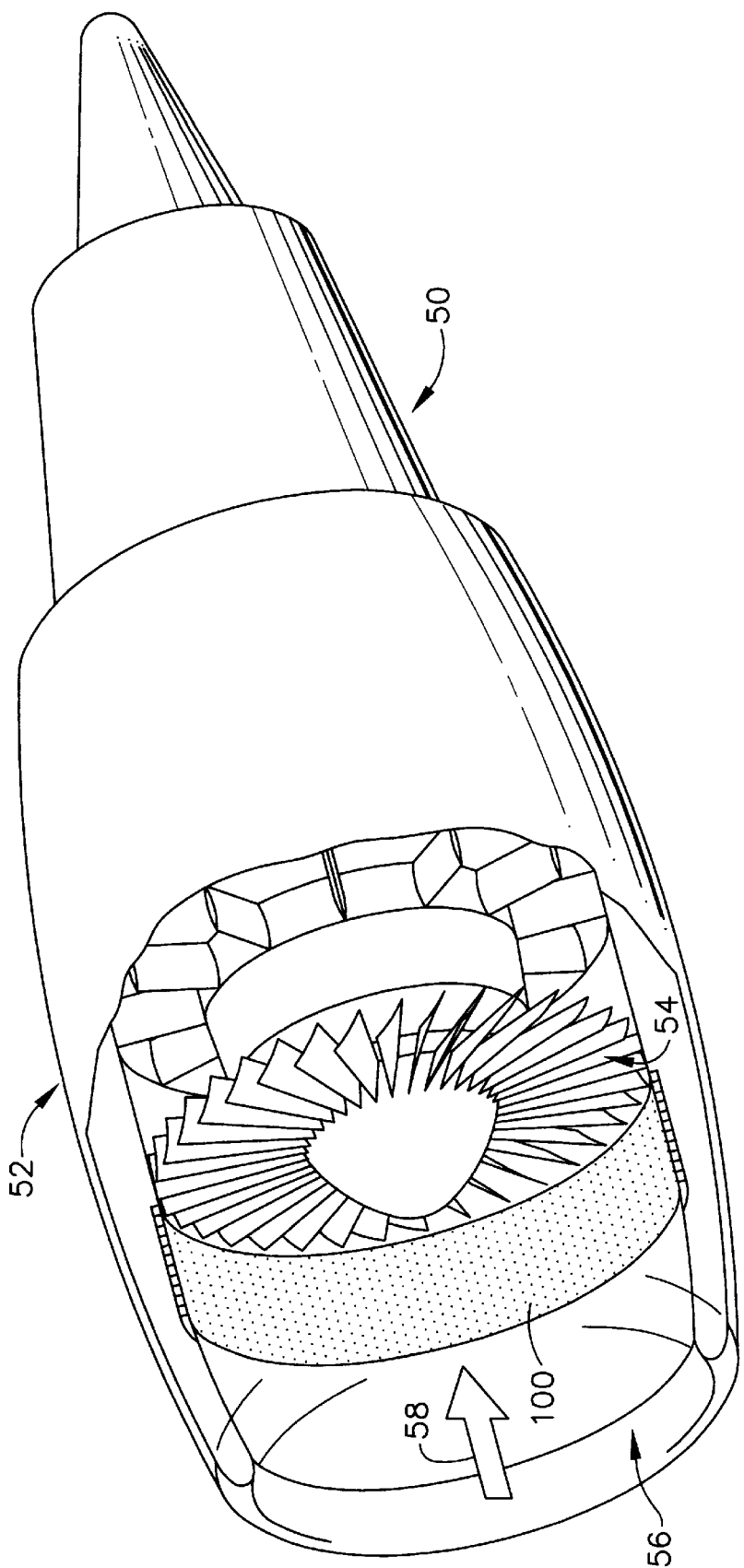
FIG. 6 depicts the acoustic treatment of the present invention installed in a turbofan gas turbine engine.

FIG. 6 depicts a turbofan gas turbine engine 50 of the type used to power an aircraft (not shown). The engine 50 includes a nacelle 52 surrounding a fan 54 that is powered by a turbine (not shown) downstream in the engine 50. The nacelle 52 includes an inlet duct 56 that receives ambient air 58, which then flows downstream through the fan 54. During engine operation, and particularly during takeoff of the aircraft when the fan blades reach transonic and supersonic velocities, noise is generated that propagates upstream and out through the inlet duct 56. In order to attenuate the noise radiated within the nacelle 52, an acoustic treatment panel 100 in accordance with this invention is positioned upstream of the fan 54, as shown in FIG. 6. The acoustic treatment panel 100 is preferably configured for attenuating noise over a relatively wide frequency range, preferable from about 800 to about 8000 Hertz, though it is foreseeable that the panel 100 could be adapted to attenuate a broader or narrower range of frequencies.

Figure 3:
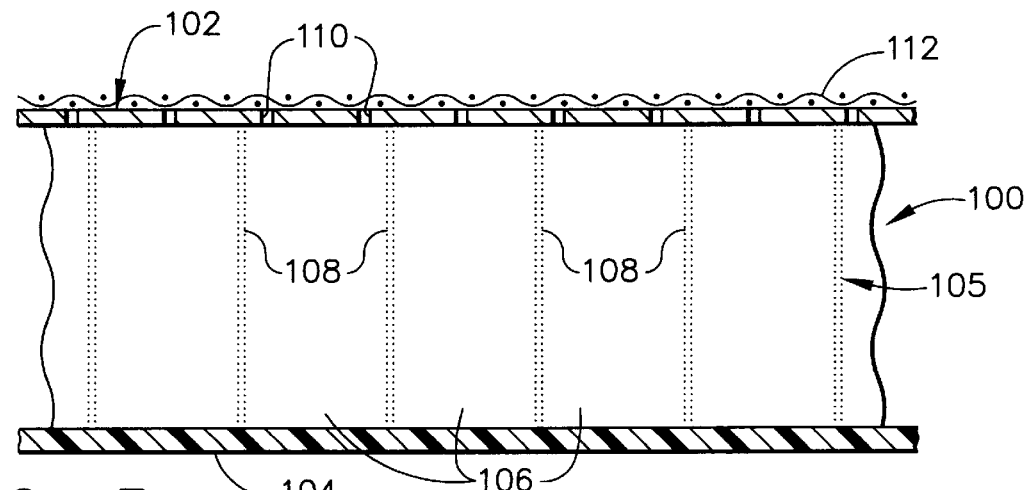
FIG. 3 represents a cross-section through an acoustic treatment in accordance with the present invention.
Figure 4:
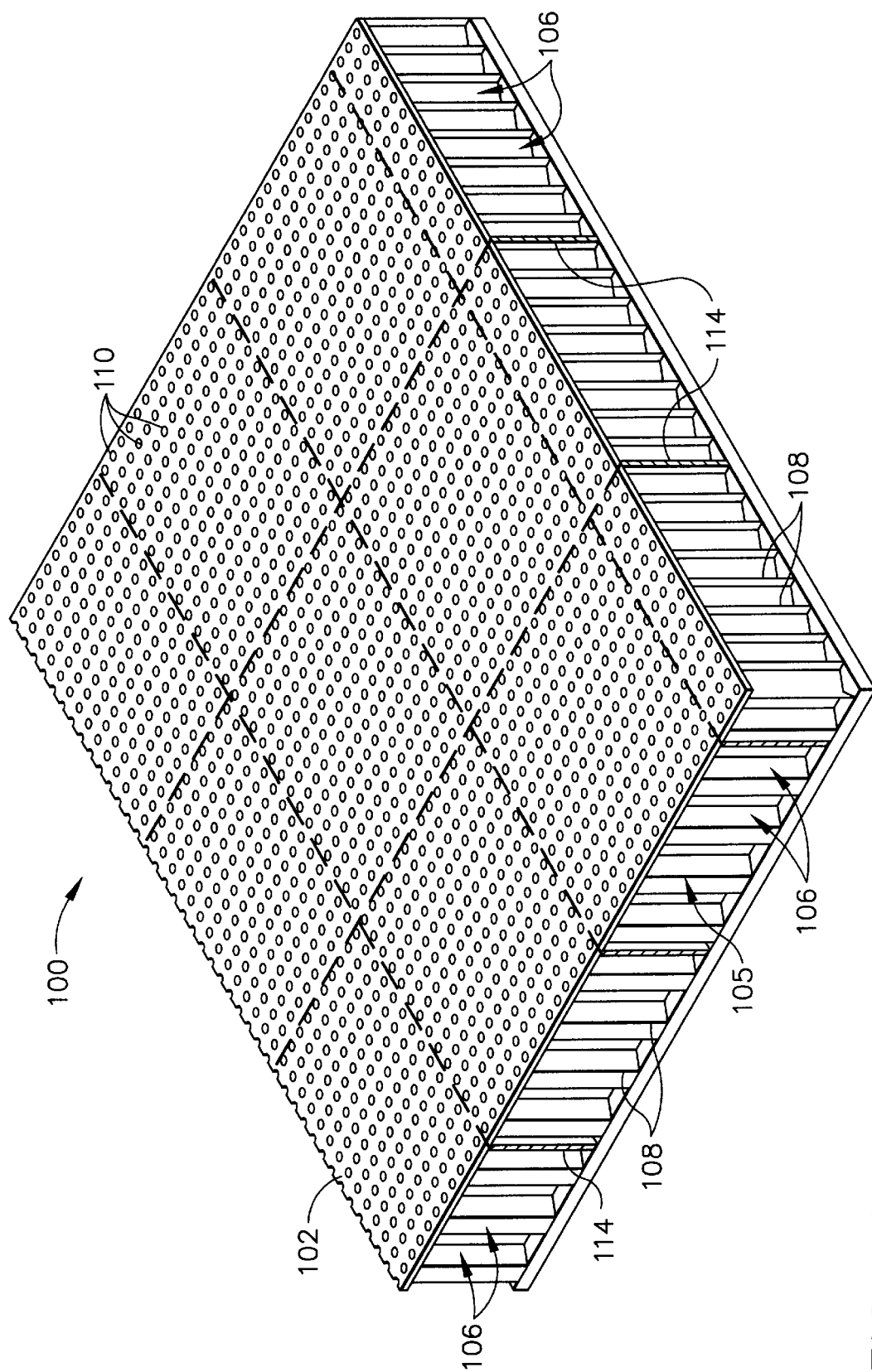
FIG. 4 is a perspective view of a section of an acoustic treatment in accordance with this invention.
Figure 5:
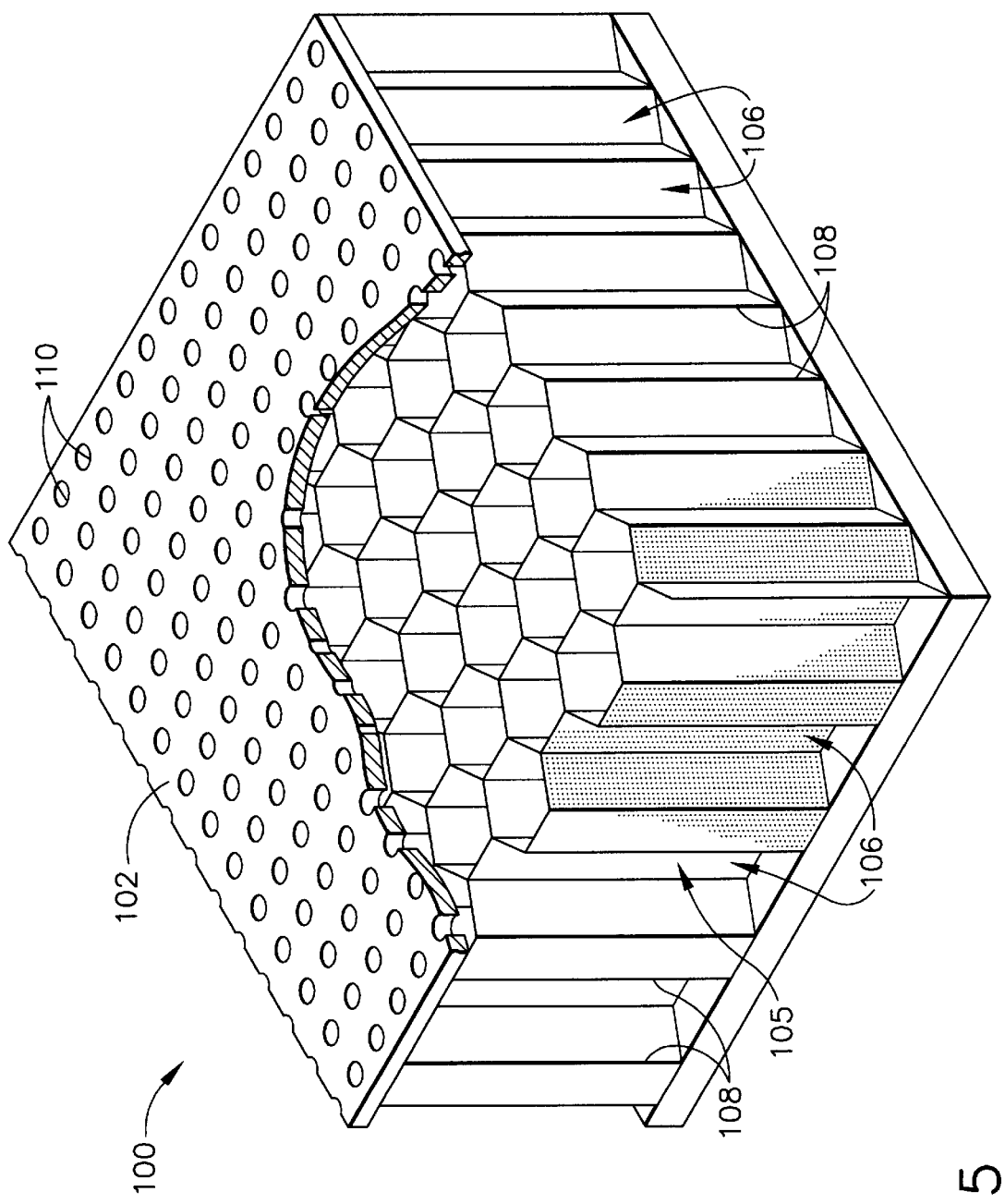
FIG. 5 is a perspective view of a small section of the acoustic treatment of FIG. 4.

FIG. 3 schematically illustrates a cross-section of the panel 100, while FIGS. 4 and 5 are perspective views of portions of the panel 100. As shown in FIGS. 3 through 5, the acoustic treatment panel 100 of this invention includes a perforated facesheet 102, a rigid backplate 104 generally parallel to and spaced apart from the facesheet 102, and an acoustic filler 105 therebetween formed by a number of compartments or cells 106. Each cell 106 is defined by walls 108 that, in accordance with this invention, are porous, and more preferably are formed entirely of a porous material. While the cells 106 are each depicted as being formed by six walls 108 so as to have a hexagonal cross-sectional shape that yields a honeycomb-like cell pattern, the cells 106 could be formed by any number of walls 108 to have any desired shape. The cells 106 are preferably identical in shape and size, so that the permeability of the walls 108 enables uniform coupling to become established through the cells 106 and parallel to the facesheet 102 and backplate 104. Alternatively, only selected walls 108 of each cell 106 could be formed of porous material, so that their permeability establishes directional coupling through the cells 106 parallel to the facesheet 102 and backplate 104.

Shown in FIG. 4 is an optional grid of partitions 114 that can be used to separate the panel 100 into larger cells, each containing a number of the hexagonal cells 106. The partitions 114 are preferably air-impermeable and attached to the facesheet 102 and backplate 104. As shown, the partitions 114 define a grid of rectangular partitioned regions, each of which surrounds a number of the cells 106. The partitions 114 contain the acoustic field that propagates parallel to the facesheet 102 and back plate 104 to a limited region of the panel 100, with the effect that a suppression advantage is achieved at certain frequencies of operation.

The facesheet 102 is formed to have a number of orifices 110 that fluidically communicate with each of the cells 106, though it is foreseeable that only some of the cells 106 could be paired with an orifice 110. The facesheet 102 can be formed of any suitable material, including metals and composite materials, chosen on the basis of weight and structural considerations. The facesheet 102 is preferably bonded directly to the cells 106 by such methods as reticulated adhesion bonding of a type known in the art. A wire mesh 112 (FIG. 3) may be bonded to the facesheet 102 to achieve added acoustic resistance.

The backplate 134 is preferably formed of a suitable metal or composite material that renders the backplate 104 acoustically rigid. A preferred material for this purpose is aluminum and its alloys. Similar to the facesheet 102, the backplate 104 is preferably bonded directly to the ends of the cells 106 opposite the facesheet 102 with an adhesive. The backplate 104 is assembled with the facesheet 102 and the porous-walled honeycomb acoustic filler 105 formed by the cells 106 to form a rigid sandwich panel acoustic treatment, which is then mounted within the inlet duct 56 as depicted in FIG. 6.

Figure 1:
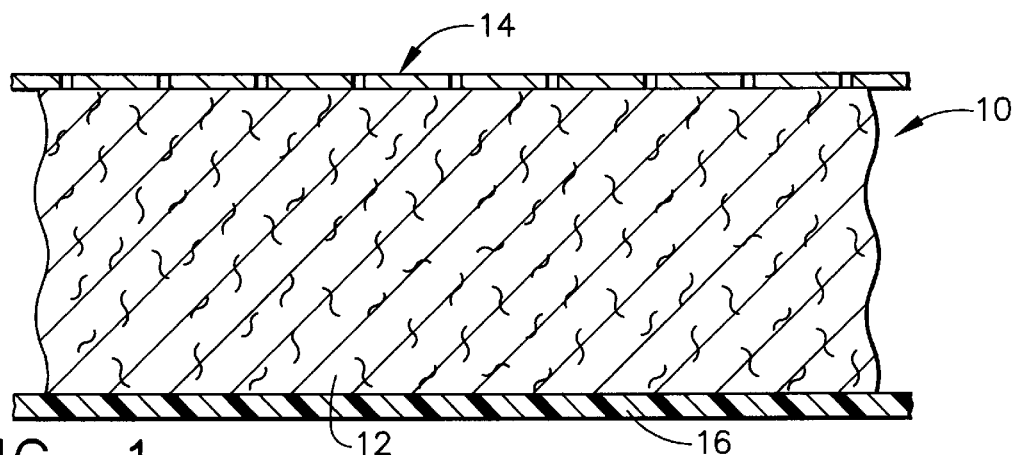
FIGS. 1 and 2 represent cross-sections through prior art bulk and resonator-type absorbers, respectively.
Figure 2:
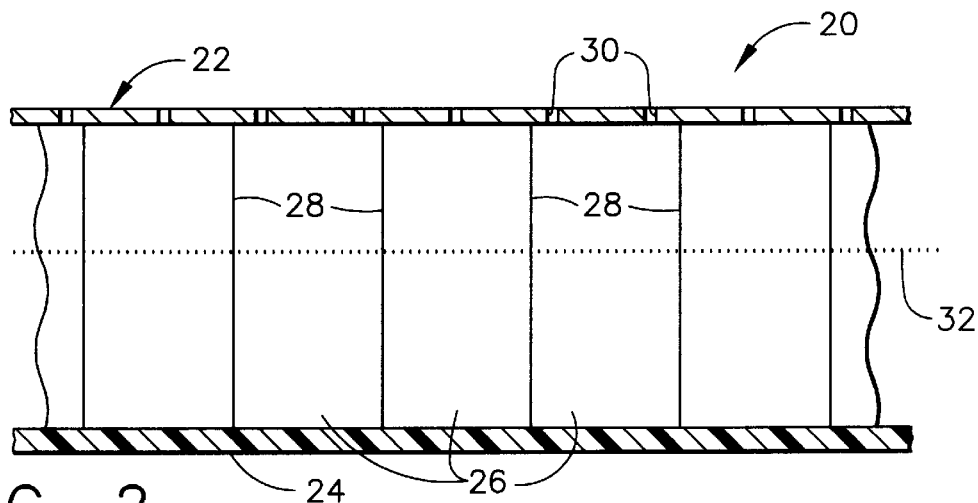

According to this invention, the porosity of the cell walls 108 enables the acoustic treatment panel 100 to exhibit acoustical properties very near that of the bulk absorber 10 of FIG. 1. To achieve this capability, each of the walls 108 of the cells 106 is preferably formed of a porous material that provides a desired level of resistance to air flow, and is sufficiently rigid to promote the structural rigidity and integrity of the panel 100. Suitable materials for this purpose include metallic and composite materials, with preferred materials being those that can easily be made permeable with the required resistance to air flow. The porous honeycomb acoustic filler 105 of this invention is preferably comparable in weight and strength to those air-impermeable honeycomb structures of the prior art. While a variety of materials can be processed to have the desired mechanical and physical properties described above, it is believed that aluminum-based and fiberglass based materials are particularly suitable.

Those skilled in the art will appreciate that the dimensional characteristics of the facesheet 102, backplate 104 and cells 106 will determine the acoustical properties of the panel 100. In particular, the thickness of the facesheet 102, the diameters of the orifices 110, and the open area ratio of the facesheet 102 resulting from the orifices 110 are specified according to known acoustic design methods. The size and shape of the impermeable partitions 114 are also acoustical design parameters. Furthermore, the depth and cross-sectional area of each cell 106 and the thickness of the cell walls 108 are to be specified according to acoustic design principles. However, the porosity of the cell walls 108 is an additional design parameter of this invention, and must be tailored to achieve a desired level of air flow resistance through the cells 106 in a direction parallel to the facesheet 102 and backplate 104. Generally, air flow resistance is specified as the steady (DC) flow resistance of the material, corresponding to a specified air flow rate through the material. In a preferred embodiment, this steady flow resistance is about 20 to about 120 CGS Rayl as determined by standard test methods.

While the above dimensions will typically be determined for a particular application, suitable dimensions for the panel 100 depicted in FIG. 5 are believed to include a facesheet thickness of about 0.40 to about 3.00 mm, orifice diameters of about 0.5 to about 2.0 mm, a facesheet open area ratio of about 5% to about 20%, a cell depth of about 12 to about 50 mm, a. cell cross-sectional area of about 30 to about 130 mm$^2$, and a cell wall thickness of about 0.075 to about 0.150 mm.

While the invention has been described in terms of a preferred embodiment, it is apparent that other forms could be adopted by one skilled in the art. Therefore, the scope of the invention is to be limited only by the following claims.

What is claimed is:

1. An acoustic treatment panel comprising:
   a facesheet having a plurality of holes therein but otherwise being air-impermeable;
   an air-impermeable backplate spaced apart from the facesheet; and
   a plurality of interconnected cells between the facesheet and backplate, each of the cells being defined by walls attached to the facesheet and the backplate, at least some of the walls being entirely porous and air-permeable to provide steady flow resistance therethrough of about 20 to about 120 CGS Rayl and allow acoustic propagation parallel to the facesheet through the cells.

2. An acoustic treatment panel as recited in claim 1, wherein each of the cells is in fluidic communication with at least one of the holes in the facesheet.

3. An acoustic treatment panel as recited in claim 1, wherein each wall of each of the cells is entirely porous and air-permeable.

4. An acoustic treatment panel as recited in claim 1, wherein each of the cells has a hexagonal cross-section parallel to the facesheet.

5. An acoustic treatment panel as recited in claim 1, wherein the walls are formed of a material selected from the group consisting of aluminum-based and fiberglass-based materials.

6. An acoustic treatment panel as recited in claim 1, wherein the facesheet is formed of a material selected from the group consisting of metals and composites.

7. An acoustic treatment panel as recited in claim 1, further comprising an air-impermeable partition wall between and attached to the facesheet and backplate, the partition wall surrounding some of the cells.

8. An acoustic treatment panel as recited in claim 1, further comprising a plurality of air-impermeable partition walls between and attached to the facesheet and backplate, each of the partition walls surrounding some of the cells.

9. An acoustic treatment panel as recited in claim 1, further comprising a wire mesh attached to the facesheet opposite the cells.

10. An acoustic treatment panel comprising:
    a facesheet having a plurality of holes therein but otherwise being air-impermeable;
    an air-impermeable backplate spaced apart from the facesheet, the backplate being mounted to an aircraft engine duct;
    a plurality of interconnected unfilled cells between the facesheet and backplate, the cells being in fluidic communication with the holes in the facesheet, each of the cells being defined by walls attached to the facesheet and the backplate, at least some of the walls being entirely porous and air-permeable to provide steady flow resistance therethrough of about 20 to about 120 CGS Rayl and allow acoustic propagation parallel to the facesheet through the cells; and
    an air-impermeable partition wall between and attached to the facesheet and backplate, the partition wall surrounding a plurality of the cells.

11. An acoustic treatment panel as recited in claim 10, wherein each of the cells has a hexagonal cross-section parallel to the facesheet.

12. An acoustic treatment panel as recited in claim 10, wherein the walls are each formed of a material selected from the group consisting of aluminum-based and fiberglass-based materials.

13. An acoustic treatment panel as recited in claim 10, wherein the facesheet is formed of an air-impermeable material selected from the group consisting of metals and composites.

14. An acoustic treatment panel as recited in claim 10, wherein the backplate is formed of a material selected from the group consisting of metallic and composite materials.

15. An acoustic treatment panel as recited in claim 10, wherein the partition wall is one of a plurality of air-impermeable partition walls between and attached to the facesheet and backplate the partition walls defining a rectangular grid of partitions each of the partitions surrounding a plurality of the cells.

16. An acoustic treatment panel as recited in claim 10, further comprising a wire mesh attached to the facesheet opposite the interconnected cells.

17. An acoustic treatment panel comprising:
    a facesheet having a plurality of holes therein but otherwise being air-impermeable;
    an air-impermeable backplate spaced apart from the facesheet, the backplate being mounted to an aircraft engine duct;
    a plurality of interconnected honeycomb-shaped unfilled cells between the facesheet and backplate, each of the cells being in fluidic communication with at least one of the holes in the facesheet, each of the cells being defined by walls attached to the facesheet and the backplate, each of the walls being entirely formed of a composite material that is porous and air-permeable to provide steady flow resistance therethrough of about 20 to about 120 CGS Rayl and allow acoustic propagation parallel to the facesheet through the cells; and
    a plurality of air-impermeable partition walls between and attached to the facesheet and backplate the partition walls defining a rectangular grid of partitions each of the partitions surrounding a plurality of the cells.

* * * * *